United States Patent
Zhu et al.

(10) Patent No.: US 6,943,202 B2
(45) Date of Patent: Sep. 13, 2005

(54) RADIATION-CURABLE POLYURETHANE

(75) Inventors: Zhenya Zhu, New Milford, CT (US); Igor V. Khudyakov, Hickory, NC (US); Ronald O. Rosenberg, Orange, CT (US)

(73) Assignee: Crompton Corporation, Middlebury, CT (US)

( * ) Notice: Subject to any disclaimer, the term of this patent is extended or adjusted under 35 U.S.C. 154(b) by 131 days.

(21) Appl. No.: 10/629,273

(22) Filed: Jul. 29, 2003

(65) Prior Publication Data

US 2005/0027090 A1 Feb. 3, 2005

(51) Int. Cl.$^7$ .............................................. C08G 18/62
(52) U.S. Cl. ........................... 522/90; 522/97; 526/301
(58) Field of Search ..................... 526/301; 522/90, 522/97

(56) References Cited

U.S. PATENT DOCUMENTS

| | | | |
|---|---|---|---|
| 3,248,372 A | 4/1966 | Bunge | |
| 3,384,624 A | 5/1968 | Heiss | |
| 4,061,662 A | 12/1977 | Marans et al. | |
| 4,182,825 A | 1/1980 | Jackle | |
| 4,246,391 A | 1/1981 | Watson, Jr. | |
| 4,288,577 A | 9/1981 | McShane, Jr. | |
| 4,312,972 A | 1/1982 | Khanna | |
| 4,385,171 A | 5/1983 | Schnabel et al. | |
| 4,775,727 A | 10/1988 | Taylor | |
| 4,892,920 A | 1/1990 | Quay et al. | |
| 5,021,507 A | 6/1991 | Stanley et al. | |
| 5,202,001 A | 4/1993 | Starner et al. | |
| 5,322,861 A * | 6/1994 | Tsuge et al. | 522/90 |
| 5,703,193 A | 12/1997 | Rosenberg et al. | |
| 5,739,194 A | 4/1998 | Natesh et al. | |
| 5,741,872 A | 4/1998 | Smith | |
| 6,171,698 B1 | 1/2001 | Khudyakov et al. | |
| 6,316,105 B1 | 11/2001 | Khudyakov et al. | |

FOREIGN PATENT DOCUMENTS

GB      1101410      6/1966

OTHER PUBLICATIONS

M. Szycher, "Szycher's Handbook of Polyurethanes", CRC Press, 1999, p. 16–1.
G. Webster, *Chemistry & Technology of UV & EB Formulation of Coatings, Inks & Paints*, vol. 2, p. 259.

* cited by examiner

*Primary Examiner*—Rachel Gorr
(74) *Attorney, Agent, or Firm*—Michael P. Dilworth

(57) ABSTRACT

A radiation-curable polyurethane is obtained from the reaction of a low free diisocyanate polyurethane prepolymer and an acrylic monomer.

40 Claims, 1 Drawing Sheet

Figure 1: Dependencies of the complex viscosity vs. shear rate for polyurethanes A and B at 25°C
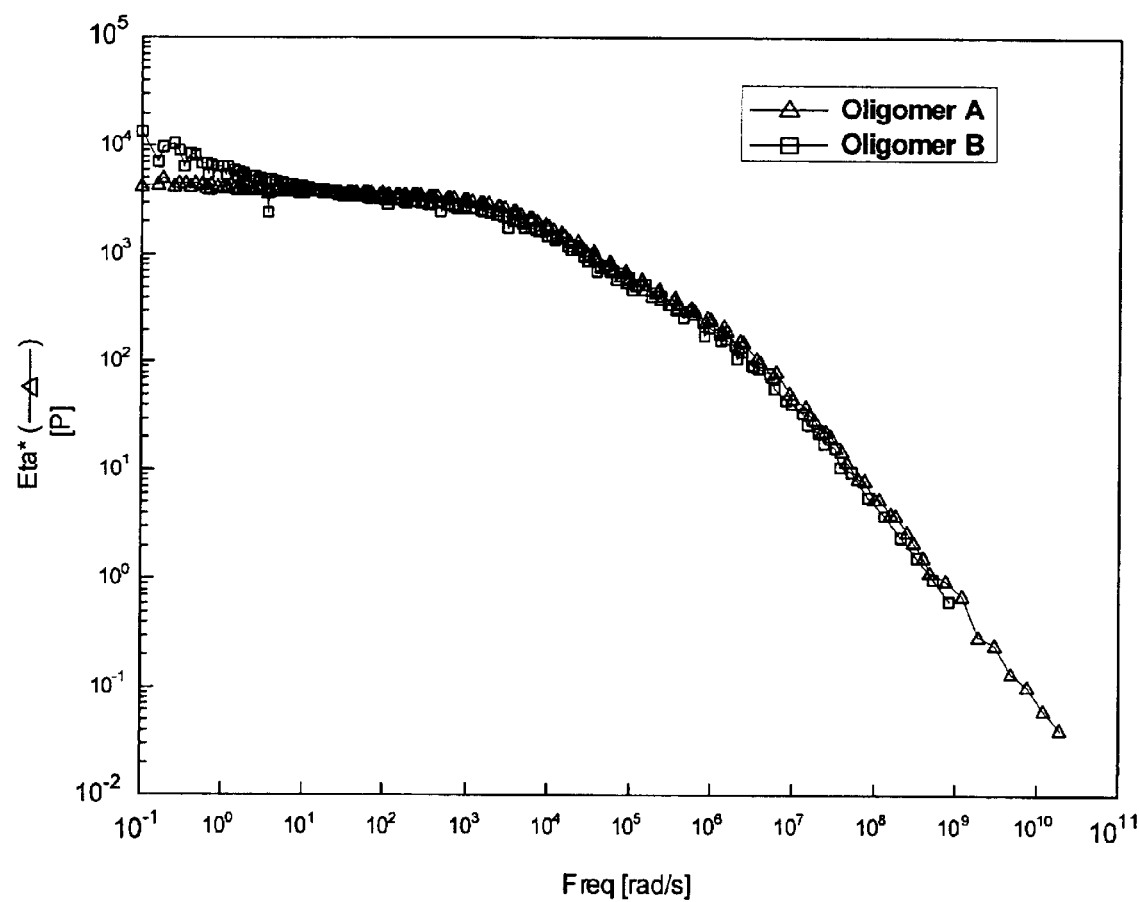

RADIATION-CURABLE POLYURETHANE

BACKGROUND OF THE INVENTION

1. Field of the Invention

This invention generally relates to the manufacture of a radiation-curable polyurethane such as a polyurethane acrylate oligomer by the reaction of a polyurethane prepolymer with an acrylic monomer. Radiation curable polyurethanes have application in, e.g., coatings, adhesives, sealants and photolithography.

2. Description of Related Art

Radiation-curable polyurethanes are well known and can be formed from isocyanate-terminated polyurethane prepolymer and an acrylic monomer with isocyanate-reactive groups such as hydroxyl groups. Acrylation of polyurethane prepolymers is widely used in UV-curable technology, see U.S. Pat. Nos. 4,775,727, 6,171,698 and 6,316,105, all of which are incorporated herein by reference in their entirety. Advantages of polyurethane acrylate oligomers include durability, excellent mechanical strength and superior abrasion resistance.

Radiation cure technology, i.e., cure by UV-light or electron beam, provides efficiency, environmental benefit (low VOC) and economy (low or acceptable cost of materials), as is evidenced by the growing application in adhesives and coatings technologies. Radiation curable formulations include acrylate oligomers, reactive acrylate diluents, photoinitiators and additives. Materials can cure in seconds, without polluting the air, and cutting costs. Other advantages include reduced energy consumption, greater productivity, single component materials, and room temperature cures (M. Szycher, "Szycher's Handbook of Polyurethanes," CRC Press, 1999, p. 16–1).

While several ingredients are usually involved in the radiation cure formulations, acrylate oligomer is the major building block used to control the final cured properties. It is also usually the largest volume component, for example, 30–60% in coating applications.

Because of the versatile chemistry of polyurethane acrylates, it is possible to produce oligomers with a wide variety of properties. Modifications can come from the varieties of choices of isocyanates, polyol backbones, and acrylic monomers. Further modification of the backbone, such as varying the chain length, the level of unsaturation, and other functional parameters, will result in coatings with a variety of performance features. Other applications of polyurethane acrylates include for example, abrasion resistant formulations for PVC and floor tiles, wood coatings, overprint varnishes and printing inks. Due to their excellent adhesion and flexibility, they are suitable for a variety of flexible plastic substrates like plasticized PVC, polyester film, and polyurethane leather cloth. Polyurethane acrylates offer excellent toughness, chemical resistance, and adhesion to difficult substrates as well.

The isocyanate-terminated polyurethane prepolymer conventionally used is based on the reaction of a molar excess of diisocyanate monomer(s), e.g., aromatic diisocyanates such as diphenylmethane diisocyanate (MDI), toluene diisocyanate (TDI), or para-phenylene diisocyanate (PPDI) or aliphatic diisocyanates such as 1,6 hexamethylene diisocyanate (HDI), dicyclohexylmethane diisocyanate ($H_{12}MDI$), isophorone diisocyanate (IPDI) or trans-1,4-cyclohexane diisocyanate (CHDI), with an organic polyol, e.g., polytetramethylene ether glycol (PTMEG), polyester, polycarbonate or polycaprolactone glycol, homopolymers and copolymers of ethylene oxide and propylene oxide (EO/PO).

While isocyanate-terminated polyurethane prepolymers can be reacted to form acrylate-endcapped oligomers for radiation curable applications, they are more commonly used without being reacted with an acrylate and without being radiation cured. More often, they are polymerized with a non-acrylate curative and without radiation, to form solid polyurethane elastomers. Such non-acrylate curatives are commonly aliphatic diols (e.g. 1,4-butanediol) or aromatic diamines (e.g. methylene-bis-ortho-chloroaniline).

The use of a molar excess of the diisocyanate monomers in forming the isocyanate-terminated polyurethane prepolymer leaves residual unreacted diisocyanate monomer, resulting in potential industrial hygiene issues. Accordingly, efforts have been made to convert diisocyanate monomer to polyurethane prepolymers with a reduced content of unreacted diisocyanate monomer. See, e.g., British Patent No. 1,101,410 and U.S. Pat. Nos. 4,182,825; 4,288,577; 4,892,920; 5,202,001 and 5,703,193. It is advantageous to have a polyurethane prepolymer with a reduced content of unreacted diisocyanate monomer in preparing polyurethane elastomers, in that, better hygiene, processing ease, and mechanical performance are achieved. Prepolymers from those diisocyanate monomers with the highest vapor pressures, hence the greatest hygiene concerns, e.g., TDI, PPDI, HDI, and IPDI, have been offered commercially in reduced unreacted monomer content from such sources as Crompton Corp., Baxenden, American Cyanamid Company and Air Products.

It is well known that both skin contact and inhalation of diisocyanate monomers must be avoided. As a result, a significant amount of attention has been given to the removal of unreacted TDI from prepolymers. Various methods to reduce the unreacted TDI content in prepolymers are known and disclosed in, for example, U.S. Pat. Nos. 3,248,372; 3,384,624 and 4,061,662. TDI prepolymers with less than 0.1% residual monomer are commercially available.

Such isocyanate-terminated prepolymers with a reduced content of free diisocyanate monomer have been known for at least 35 years. However, such prepolymers have not been previously endcapped with acrylates to form radiation-curable polyurethane acrylate oligomers. Only conventional prepolymers with an unreduced content of diisocyanate monomer have been used for this purpose. There has not been any known reason up to now to use prepolymers with a reduced monomer content, since acrylation converts any free diisocyanate monomer to its nonvolatile acrylate diadduct. The hygiene issue associated with the volatile free diisocyanate monomer in the starting prepolymer was thereby eliminated in the resulting acrylate-endcapped oligomer.

However, it has now been surprisingly found that there is an improvement in acrylate-endcapped oligomer when the starting isocyanate-terminated prepolymer is of the reduced free monomer type. The acrylate-endcapped oligomer has a significantly lower viscosity, and broader Newtonian viscosity plateau, i.e. viscosity remains essentially constant over a broader range of shear rate.

Radiation-curable compositions are advantageous because the materials are fast curing, low pollution and low cost. As stated above, radiation-curable polyurethane acrylate oligomers are one of the major components of these formulations, but polyurethane acrylates, like most radiation curable oligomers, are highly viscous. Diluents are thus generally required to make the thin film application possible for an end user.

There are various methods of reducing the viscosity of acrylate oligomers, see G. Webster, *Chemistry & Technology of UV & EB Formulation of Coatings, Inks & Paints*, Volume 2, p.259. One method is the addition of an organic solvent, which detracts from the many advantages radiation curable systems offer. Unfortunately, the solvents are a source of atmospheric pollution and can contribute to flammability. Another method is the addition of water to the formulation. There are certain advantages to this method, such as low cost, non-flammability and non-toxicity. However, there are several disadvantages such as poor compatibility with the oligomer and high heat of vaporization leading to difficulty in removing the water from the matrix. A further method is the addition of reactive diluents which are typically acrylic or methacrylic monomers. These reactive diluents are compatible with oligomers, will totally incorporate into the structure of the finished film and are widely used in current radiation curable industry. However, certain disadvantages remain such as the flammability and the toxicity of the diluents. These reactive diluents will participate in the reaction and alter the final properties of the finished film. While some of the effects on the final properties may be positive, others may not be desirable.

Various processes have been developed that attempt to reduce the presence of unreacted diisocyanate monomer content in polyurethane prepolymers. Among the various processes that have been developed in attempts to reduce the quantity of unreacted monomeric diisocyanate content in prepolymers are processes or methods that use falling film evaporators, wiped film evaporators, distillation techniques, solvent extraction, and molecular sieves. For example, U.S. Pat. No. 4,182,825 discloses a process to reduce the amount of diisocyanate (TDI) by distilling a prepolymer reaction product under vacuum conditions. U.S. Pat. No. 4,385,171 discloses a method for the removal of unreacted diisocyanate monomer (TDI) from prepolymers by codistilling the prepolymer reaction product with a compound that boils at a temperature greater than the boiling point of the diisocyanate. U.S. Pat. No. 5,703,193 discloses a process for reducing the amount of residual organic diisocyanate monomer (PPDI) in prepolymers by codistilling the reaction product in the presence of a combination of two inert solvents, with the first inert solvent having a boiling point below the boiling point of the diisocyanate monomer and the second inert solvent having a boiling point above the boiling point of the diisocyanate monomer. U.S. Pat. No. 4,061,662 discloses a process for the removal of unreacted toluene diisocyanate from prepolymers by passing the prepolymer reaction product through a column containing molecular sieves. U.S. Pat. No. 4,288,577 discloses the removal of unreacted methylene bis(4-phenyl isocyanate) (MDI) via solvent extraction with hexane.

Of these processes, distillation is a much simpler and more economical technique than solvent extraction or molecular sieve adsorption. There is no need to subsequently separate the monomer from either (flammable) hexane solvent or molecular sieves. However, in the distillation of diisocyanate monomers from polyurethane prepolymers, high temperatures must be avoided to prevent decomposition reactions in the prepolymer. Distillation without use of solvents is simpler still.

Of the polyurethane prepolymers with reduced unreacted diisocyanate monomer content that have been described, there remains a need for a radiation-curable composition such as a polyurethane-acrylate oligomer that is made from such a reduced unreacted diisocyanate prepolymer. Therefore, it would be advantageous to be able to produce a low-viscosity polyurethane acrylate oligomer without any of the above noted difficulties, while still maintaining the above stated advantages of polyurethane acrylate oligomers.

SUMMARY OF THE INVENTION

It is an object of the invention to provide a radiation-curable composition of low viscosity prepared by reacting a polyurethane prepolymer containing a reduced content of unreacted diisocyanate monomer with an acrylate possessing reactive functionality.

It is a particular object of the invention to provide a radiation-curable composition of low viscosity prepared by reacting a polyurethane prepolymer containing a reduced content of unreacted diisocyanate monomer (e.g. by vacuum distillation) with an acrylate possessing at least one hydroxyl functionality.

In keeping with these and other objects of the invention, there is provided a radiation-curable polyurethane produced by the process which comprises:

a) reacting at least one diisocyanate monomer with at least one polyol to provide a polyurethane prepolymer containing unreacted diisocyanate monomer;

b) removing unreacted diisocyanate monomer from the polyurethane prepolymer to provide polyurethane prepolymer of reduced unreacted diisocyanate monomer content, and;

c) reacting the polyurethane prepolymer of reduced unreacted diisocyanate monomer content with an acrylic monomer to provide radiation-curable polyurethane.

The foregoing polyurethane may use polyols chosen from ether, ester, caprolactone, carbonate, etc. Either aromatic or aliphatic diisocyanates can be used in the excess amount over the polyols. The molar ratio of the diisocyanate monomer to the one or more polyols (i.e., the molar ratio of NCO groups to OH groups) can range from about 2:1 to about 30:1, with about 3:1 to about 20:1 being preferred. The excess amount of diisocyanate is used for the purpose of favoring the formation of an isocyanate-polyol-isocyanate structure. The un-reacted diisocyanate will be removed by vacuum distillation after the prepolymer reaction is done, giving the product low free isocyanate prepolymer. These prepolymers have residual diisocyanate monomer level<2%. Preferably, they are<0.1%.

Polyurethane acrylate oligomers are made from the reaction of low free isocyanate prepolymer and acrylate. These oligomers are more regular in structure and have a narrower molecular weight distribution. It has been found that they offer a reduced viscosity and a broader plateau of Newtonian viscosity compared to that of oligomers made from the conventional route. This novel oligomer gives the radiation curable industry the opportunity to eliminate or reduce the amount of diluents in application formulations.

BRIEF DESCRIPTION OF THE DRAWING

FIG. 1 is a graphical comparison of the complex viscosity vs. shear rate for a radiation-curable polyurethane acrylate oligomer based on reduced free monomer prepolymer in accordance with this invention (Polyurethane A, prepared in Example 6, infra) and a prior art radiation-curable polyurethane acrylate oligomer based on conventional isocyanate-terminated prepolymer from which unreacted diisocyanate has not been removed (Polyurethane B, prepared in Comparative Example VI, infra).

DESCRIPTION OF THE PREFERRED EMBODIMENTS

A radiation-curable composition is one that can be cured by ultra-violet light or electron beam. Acrylate oligomers are the major component of radiation-curable compositions. They are formed, as stated above, from the reaction of isocyanate-terminated polyurethane prepolymers and an acrylic monomer containing reactive functionality such as carboxylic acid, hydroxyl and amine.

The polyurethane prepolymers herein can be obtained by reacting one or more polyols with a diisocyanate monomer by procedures known in the art. According to the present invention, a polyurethane prepolymer is formed by the reaction of one or more polyols, e.g., polyethers and/or polyesters, with a large excess of diisocyanate monomer, such as TDI. Optionally, the reaction of the diisocyanate with the polyol has a solvent added thereto such as dimethyl adipate and dimethyl phthalate.

Both aliphatic and aromatic diisocyanates can be used. Suitable diisocyanate monomers can be 2,4 and 2,6 toluene diisocyanate (TDI), 4,4'-diphenyl methane diisocyanate (MDI), p-phenylene diisocyanate (PPDI), tolidene diisocyanate (TODI), hexamethylene diisocyanate (HDI), tetramethylxylene diisocyanate (TMXDI), isophorone diisocyanate (IPDI), dicyclohexylmethane diisocyanate ($H_{12}MDI$), and mixtures thereof.

Suitable polyols for use herein are typically high molecular weight polyols including, but not limited to, polyethers, polyesters such as, for example, polycaprolactones, polycarbonates, or hydrocarbon polyols having a molecular weight ranging from about 100 to about 12,000. It is to be understood herein that all references to molecular weights and equivalent weights are number average molecular weights and number average equivalent weights, respectively. If desired, low molecular weight glycols or triols, e.g., glycols or triols having a molecular weight from about 60 to about 250, can be included. Higher molecular weight polyols, e.g., those having a molecular weight of from about 250 to about 12,000, can also be used to prepare the prepolymer of the instant invention. Preferably the polyols have a molecular weight of about 400 to about 6000 and more preferably a molecular weight of from about 500 to about 4000.

The preferred polyether polyols are poly(oxyalkylene) ether polyols represented by the general formula $HO(RO)_nH$ wherein R is an alkylene radical, of 2, 3 or 4 carbon atoms and the value of n is such that the polyether polyol will have a number average molecular weight of at least about 250. These polyalkyleneether polyols are well-known components of polyurethane products and can be prepared by the polymerization of cyclic ethers, e.g., alkylene oxides, and glycols, dihydroxyethers, and the like by methods known in the art. Examples include those polyether polyols available as Terathane PTMEG polyols from Dupont and Poly G polyols of propylene oxide and ethylene oxide from Arch Chemical.

Useful polyester polyols can be obtained from the reaction of dibasic acids, e.g., adipic acid, glutaric, sebacic, or phthalic acid, with diols such as, for example, ethylene glycol, 1,2-propylene glycol, 1,4-butanediol, 1,6-hexanediol, and the like. Minor amounts of units of higher functionality such as glycerol or trimethylolpropane may also be employed. Polyester polyols are commercially available and include such polyols as Fomrez polyester polyols from Crompton and as Rucoflex polyester polyols from Bayer.

Polyester polyols can also be made from caprolactone or dimerized unsaturated fatty acids. Useful polycaprolactone-based polyols include the TONE polyols from Dow. Polycarbonate polyols are also useful and are available, e.g., as Desmophen 2020E from Bayer. Other suppliers of similar materials include Daicel (Japan) and Ube (Japan). Suitable hydrocarbon polyols include those produced from butadiene, available as Poly-Bd from Sartomer and Krasol from Kaucuk (Czech Republic). Preferred polyols of the current invention include polytetramethylene ether glycols (PTMEG), polycaprolactones, polycarbonates and polyesters derived from adipic acid.

The polyol of the instant invention can be a combination of high molecular weight polyol, as previously described, and low molecular weight polyol. An aliphatic glycol is the preferred low molecular weight polyol. Suitable aliphatic polyols are ethylene glycol, diethylene glycol, triethylene glycol, tetraethylene glycol, propylene glycol, dipropylene glycol, tripropylene glycol, neopentyl glycol, 1,3-butanediol, 1,4-butanediol, and the like. In general, the weight of the low molecular weight polyol should be no more than 20% of the combination of high molecular weight polyol and low molecular weight polyol. The preferred range is 0 to 15% of the combination; more preferred is 0–8%.

When forming the polyurethane prepolymer, a mole ratio ordinarily ranging from about 2:1 to about 30:1 diisocyanate/polyol and preferably about 3:1 to about 20:1 diisocyanate/polyol is recommended. The reaction is typically carried out at a reaction temperature ranging from about 50° C. to about 120° C. Preferably, the reaction is carried out by maintaining the reaction temperature at about 60 to about 110° C. with agitation.

When the preferred mole ratios of isocyanate to polyol are used, the polyurethane prepolymer can be of low viscosity and primarily comprises the urethane-linked adduct of diisocyanate-polyol-diisocyanate structure (termed herein as an ABA structure, where A denotes diisocyanate and B denotes a polyol). Higher molecular weight adducts containing two or more polyol moieties are typically less desirable due to increased viscosity.

The invention results in a radiation-curable polyurethane that has a significantly reduced viscosity as compared to radiation curable compositions where the unreacted diisocyanate monomer is not removed from the polyurethane prepolymer prior to reacting the prepolymer with the acrylic reactant The viscosity of the radiation-curable polyurethane herein can range from about 500 to about 30000 cps at about 50° C. and preferably from about 1000 to about 20000 cps, depending on the diisocyanate monomer, the polyol and the acrylate selected, as well as the temperature at which viscosity is measured. A diisocyanate:polyol mole ratio of at least about 3:1 or greater favors the formation of a final prepolymer (after removal of free diisocyanate monomer) with NCO content of at least 70% of the theoretical NCO content for a pure ABA structure and preferably at least 80% of the theoretical NCO content for a pure ABA structure.

If polyol B has a functionality of 2, then each ABA and ABABA adduct has two unreacted NCO groups, one on each of the terminal A moieties. The internal A moiety in the ABABA adduct has no remaining unreacted NCO group. Therefore, the ABABA adduct has a lower NCO content than the ABA adduct. Accordingly, in a polyurethane prepolymer substantially free of unreacted A, the relative content of ABA to higher molecular weight adducts can be determined by the NCO content of the mixture. By employing a large molar excess of diisocyanate over polyol, formation of large adduct ABABA is minimized. As an illustration, a difunctional polyol having a number average molecular weight of 1000 and HDI having a molecular weight of 168 will provide an ABA adduct having a molecular weight 168+1000+168=1336. The adduct would have two NCO end groups, each being 42 daltons. Thus, the NCO content would be 2(42)/1336=6.3% for the ABA structure. Similarly, an ABABA structure possessing a molecular weight of 2504 will have an NCO content of 2(42)/2504= 3.35%. This is termed theoretical NCO content for the ABA or ABABA adducts.

The NCO content of a prepolymer can be determined by known titration methods, e.g., as described in ASTM method D2572, or by FTIR.

The polyurethane prepolymer prepared in accordance with the present invention generally contains a large amount of unreacted diisocyanate monomer most or substantially all of which will be removed therefrom prior to reacting the prepolymer with the acrylic monomer. Such removal of unreacted diisocyanate monomer can be readily achieved, e.g., by distillation. Distillation equipment that can be efficiently operated at deep vacuum, moderate temperature, and short residence time is advantageously used in the distillation operation. For example, one can use an agitated film distillation system commercialized by such sources as Pope Scientific, Inc.; Artisan Industries, Inc.; Canzler GmbH & Co.; Pfaudler-U.S., Inc.; InCon Technologies, L.L.C.; Luwa Corp.; UIC Inc.; or Buss-SMS GmbH for this purpose. Continuous units with internal condensers that can be combined in series are preferred because they can reach lower operating vacuums of from about 0.001 to about 1 Torr. Preferably, the system is a wiped film vacuum distillation process.

Unreacted diisocyanate monomer can be stripped from the polyurethane prepolymer at a pressure of from about 0.001 to about 10 Torr and at a temperature ranging from about 80° C. to about 200° C., and preferably at a pressure of from about 0.01 to about 0.1 Torr or below and at a temperature of from about 100° C. to about 160° C. or below. The importance of minimizing high temperature degradation of polyurethane prepolymers is described in British Patent No. 1,101,410, which recommends that distillation be conducted under vacuum with an evaporative temperature preferably under 175° C. U.S. Pat. No. 4,182,825 describes the use of evaporative jacket temperatures of 150–160° C. for TDI prepolymers. U.S. Pat. No. 5,703,193 recommended jacket temperature of 120° C.

It is desirable that in operation of agitated film distillation equipment, the condenser temperature for the distillate be at least about 100° C. below the evaporative temperature. The condenser must also be cold enough to efficiently condense substantially all free diisocyanate vapor. A condenser temperature of from about 50 to about 0° C. or below is preferred.

If the recommended stripping conditions are observed, the residue (prepolymer) will typically contain less than about 2% by weight of free (i.e., unreacted) diisocyanate monomer, preferably less than about 0.5% by weight of free diisocyanate monomer and more preferably less than about 0.1% by weight of free diisocyanate monomer. If desired, the stripped diisocyanate monomer can be used to produce more prepolymer. Generally, the resulting polyurethane prepolymers will have low viscosity, low unreacted diisocyanate monomer content and high NCO content (preferably 80% or more of the theoretical NCO content for the ABA structure).

The polyurethane prepolymer containing low free diisocyanate monomer is thereafter reacted with an acrylic monomer possessing at least one reactive functionality, such as carboxylic acid group(s) or hydroxyl and/or amine group(s). Suitable acrylic monomers include vinyl carboxylic acids, acrylic acid, methacrylic acid, amino alkyl acrylates, amino alkyl methacrylates, hydroxyalkyl acrylates, hydroxyalkyl methacrylates and hydroxyalkylalkyacrylates such as hydroxyethyl acrylate, hydroxyethyl methacrylate, hydroxypropylacrylate, hydroxypropyl-methacrylate, hydroxybutylacrylate, and the like, and mixtures thereof. Hydroxy functionality is preferred.

As a result of the reaction of the low free diisocyanate monomer polyurethane prepolymer with the acrylic monomer, the polyurethane prepolymer is endcapped with groups containing ethylenic unsaturation. Advantageously, the ratio of functionality, e.g., hydroxyl, of the acrylic monomer to the available NCO content of the polyurethane prepolymer is from about 0.9:1 to about 1.2:1 and preferably from about 1.05:1 to about 1.10:1. The temperature of this reaction can range from about 30° to about 90° C. and preferably from about 50 to about 70° C.

Optionally, one or more inhibitors of free radical reactions such as 4-methoxyphenol can be added to the reaction of the polyurethane prepolymer and the acrylic monomer with hydroxyl functionality at a level of 50 ppm to 1% by weight based on the entire amount of the reaction mixture. One or more catalysts such as dibutyltin dilaurate can optionally be added, e.g., up to about 3% by weight of the reaction mixture.

In addition, the polyurethane of the present invention displays the property of having a high Newtonian plateau. Examples (1–8) are illustrative of the radiation-curable polyurethane of the invention and Comparative Examples I–VII are illustrative of the prior art, i.e., where unreacted diisocyanate monomer is not removed from the polyurethane prepolymer prior to reacting the latter with acrylic monomer to form radiation-curable polyurethane.

The following abbreviations are used in the examples:

TDI: Toluene diisocyanate

MDI: 4,4'-Diphenyl methane diisocyanate

LFMDI: Low free 4,4'-Diphenyl methane diisocyanate

PPDI: p-Phenylene diisocyanate

HDI: 1,6-Hexamethylene diisocyanate

PTMEG 1000: MW=1000g/mol nominal. Polytetramethylene ether glycol (Functionality 2.0)

PBHAG 2000: Polyester of butanediol/hexanediol (at 40/60 mole ratio) and adipic acid (Functionality 2.0) having an MW of 2000g/mol nominal.

HEA: 2-Hydroxyethyl acrylate

HEMA: 2-Hydroxyethyl methacrylate

EXAMPLE 1

This example illustrates the preparation of a radiation-curable polyurethane acrylate oligomer using HEA and reduced (low) free TDI prepolymer from PTMEG polyol in accordance with the invention.

A polyurethane prepolymer was prepared by charging first 562 parts TDI, then 1000 parts PTMEG 1000 (930 MW) to a batch reaction flask equipped with a nitrogen sweep, an agitator, a thermometer, a heating mantle and a vacuum source. The molar ratio of TDI to PTMEG (hence the equivalent ratio of NCO groups to OH groups) was 3:1. The reaction mixture was heated for 6 hours at 60° C. under a vacuum of 1–10 Torr during the last hour to remove entrained gases.

The crude reaction mixture was then processed through a wiped film evaporator to remove unreacted TDI monomer;

vacuum was 0.04 Torr or less; jacket temperature was 120° C. and condenser temperature was 5° C.

The stripped polyurethane prepolymer contained less than 0.1% free TDI, and had an NCO content of 6.10%. This is 93% of the theoretical value of 6.58% for prepolymer of pure TDI-PTMEG-TDI structure (1278 MW when PTMEG is 930 MW).

The stripped polyurethane prepolymer (1000 parts) was charged to a batch reaction flask equipped with a dry air purge, an agitator, a thermometer and a heating mantle followed by the addition of 177 parts of 2-hydroxyethyl acrylate. 4-Methoxyphenol (200 ppm), an inhibitor of free radical reactions, and 0.5% dibutyltin dilaurate, a catalyst for urethane formation, were then added. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

COMPARATIVE EXAMPLE I

This comparative example illustrates the preparation of a radiation-curable polyurethane acrylate oligomer in accordance with the prior art, i.e., using an isocyanate-terminated polyurethane prepolymer from which none of the unreacted diisocyanate monomer is removed. HEA is used to acrylate the conventional TDI prepolymer with PTMEG polyol.

A polyurethane prepolymer was prepared by charging 374 parts TDI, then 1000 parts PTMEG 1000 (930 MW) to a batch reaction flask equipped with a nitrogen sweep, an agitator, a thermometer, a heating mantle and a vacuum source. The molar ratio of TDI to PTMEG (hence the equivalent ratio of NCO groups to OH groups) was 2:1. The reaction mixture was heated for 6 hours at 60° C. and with a vacuum of 1–10 Torr during the last hour to remove entrained gases.

The foregoing prepolymer was combined with 250 parts of hydroxyethyl acrylate, followed by 200 ppm 4-methoxyphenol and 0.5% dibutyltin dilaurate. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

EXAMPLE 2

This example illustrates the preparation of a radiation-curable polyurethane using HEMA and low free TDI prepolymer with PTMEG polyol in accordance with the invention.

A polyurethane prepolymer was prepared by charging first 562 parts TDI, then 1000 parts PTMEG 1000 (930 MW) to a batch reaction flask equipped with a nitrogen sweep, an agitator, a thermometer, a heating mantle and a vacuum source. The molar ratio of TDI to PTMEG (hence the equivalent ratio of NCO groups to OH groups) was 3:1. The reaction mixture was heated for 6 hours at 60° C. and under a vacuum of 1–10 Torr during the last hour to remove entrained gases.

The crude reaction mixture was then processed through a wiped film evaporator to remove unreacted TDI monomer; the vacuum was 0.04 Torr or less; the jacket temperature was 120° C. and the condenser temperature was 5° C.

The stripped polyurethane prepolymer contained less than 0.1% free TDI, and had an NCO content of 6.10%. This is 93% of the theoretical value of 6.58% for prepolymer of pure TDI-PTMEG-TDI structure (1278 MW when PTMEG is 930 MW).

The stripped polyurethane prepolymer (1000 parts) was charged to a batch reaction flask equipped with dry air purge, an agitator, a thermometer, and a heating mantle followed by the addition of 198 parts of 2-hydroxyethyl methacrylate. 4-Methoxyphenol (200 ppm), an inhibitor of free radical reactions, and 0.5% dibutyltin dilaurate, a catalyst for urethane formation, were then added. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

COMPARATIVE EXAMPLE II

This comparative example illustrates the preparation of radiation-curable polyurethane using HEMA and conventional TDI prepolymer with PTMEG polyol.

A polyurethane prepolymer was prepared by charging 374 parts TDI, then 1000 parts PTMEG 1000 (930 MW) to a batch reaction flask equipped with a nitrogen sweep, an agitator, a thermometer, a heating mantle and a vacuum source. The molar ratio of TDI to PTMEG (hence the equivalent ratio of NCO groups to OH groups) was 2:1. The reaction mixture was heated for 6 hours at 60° C. with vacuum of 1–10 Torr during the last hour to remove entrained gases.

The foregoing prepolymer was combined with 280 parts of hydroxyethyl methacrylate, followed by 200 ppm 4-methoxyphenol and 0.5% dibutyltin dilaurate. The reaction mixture was heated for at least 2 hours at 80° C. until the % NCO was less than 0.1% as determined by titration and the peak of NCO disappeared on the FTIR spectrum. The viscosity of the acrylate oligomer was measured by Brookfield viscometer at various temperatures.

EXAMPLE 3

This example illustrates the preparation of a radiation-curable polyurethane using HEA and low free TDI prepolymer with PBHAG 2000 in accordance with the invention.

A polyurethane prepolymer was prepared by charging first 282 parts TDI, then 1000 parts PBHAG2000 (polybutylene-hexamethylene adipate glycol, 1850 MW) to a batch reaction flask equipped with a nitrogen sweep, an agitator, a thermometer, a heating mantle and a vacuum source. The ratio of butylene/hexamethylene in the polyol was 4/6. The molar ratio of TDI to PBHAG (hence the equivalent ratio of NCO groups to OH groups) was 3:1. The reaction mixture was heated for 6 hours at 60° C. and under a vacuum of 1-10 Torr during the last hour to remove entrained gases.

The crude reaction mixture was then processed through a wiped film evaporator to remove unreacted TDI monomer; the vacuum was 0.04 Torr or less; the jacket temperature was 120° C. and the condenser temperature was 5° C.

The resulting prepolymer had 3.67% NCO content, 96% of the theoretical value of 3.82% for prepolymer of pure diisocyanate-polyol-diisocyanate structure (2198 MW when polyol is 1850 MW) and free TDI content was <0.10%.

The stripped polyurethane prepolymer (1000 parts) was charged to a batch reaction flask equipped with dry air purge, an agitator, a thermometer, and a heating mantle followed by the addition of 106 parts of 2-hydroxyethyl acrylate. 4-Methoxyphenol (200 ppm), an inhibitor of free radical reactions, and 0.5% dibutyltin dilaurate, a catalyst for urethane formation, were then added. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

COMPARATIVE EXAMPLE III

This comparative example illustrates the preparation of a radiation-curable polyurethane using HEA and conventional TDI prepolymer with PBHAG polyol.

A polyurethane prepolymer was prepared by charging 188 parts TDI, then 1000 parts PBHAG 2000 to a batch reaction flask equipped with a nitrogen sweep, an agitator, a thermometer, a heating mantle and a vacuum source. The ratio of butylene/hexamethylene in the polyol was 4:6. The molar ratio of TDI to PBHAG (hence the equivalent ratio of NCO groups to OH groups) was 2:1. The reaction mixture was heated for 6 hours at 60° C. with a vacuum of 1–10 Torr during the last hour to remove entrained gases.

The foregoing prepolymer was combined with 132 parts of hydroxyethyl acrylate, followed by 200 ppm 4-methoxyphenol and 0.5% dibutyltin dilaurate. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

EXAMPLE 4

This example illustrates the preparation of a radiation-curable polyurethane using HEMA and low free TDI prepolymer with PBHAG polyol in accordance with the invention.

A polyurethane prepolymer was prepared by first charging 282 parts TDI, then 1000 parts PBHAG2000 to a batch reaction flask equipped with a nitrogen sweep, an agitator, a thermometer, a heating mantle and a vacuum source. The ratio of butylene/hexamethylene in the polyol was 4:6. The molar ratio of TDI to PBHAG (hence the equivalent ratio of NCO groups to OH groups) was 3:1. The reaction mixture was heated for 6 hours at 60° C. and under a vacuum of 1–10 Torr during the last hour to remove entrained gases.

The crude reaction mixture was then processed through a wiped film evaporator to remove unreacted TDI monomer; the vacuum was 0.04 Torr or less; the jacket temperature was 120° C. and the condenser temperature was 5° C.

The resulting prepolymer had 3.67% NCO content, 96% of the theoretical value of 3.82% for prepolymer of pure diisocyanate-polyol-diisocyanate structure (2198 MW when polyol is 1850 MW) and free TDI content was <0.10%.

The stripped polyurethane prepolymer (1000 parts) was charged to a batch reaction flask equipped with a dry air purge, an agitator, a thermometer, and a heating mantle followed by the addition of 119 parts of 2-hydroxyethyl methacrylate. 4-Methoxyphenol (200 ppm), an inhibitor of free radical reactions, and 0.5% dibutyltin dilaurate, a catalyst for urethane formation, were then added. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

COMPARATIVE EXAMPLE IV

This comparative example illustrates the preparation of radiation-curable polyurethane using HEMA and conventional TDI prepolymer with PBHAG polyol.

A polyurethane prepolymer was prepared by charging 188 parts TDI, then 1000 parts PBHAG2000 (polybutylene-hexamethylene adipate glycol, 1850 MW) to a batch reaction flask equipped with a nitrogen sweep, an agitator, a thermometer, a heating mantle and a vacuum source. The ratio of butylene/hexamethylene in the polyol was 4:6. The molar ratio of TDI to PBHAG (hence the equivalent ratio of NCO groups to OH groups) was 2:1. The reaction mixture was heated for 6 hours at 60° C. with a vacuum of 1–10 Torr during the last hour to remove entrained gases.

The foregoing prepolymer was combined with 148 parts of hydroxyethyl methacrylate, followed by 200 ppm 4-methoxyphenol and 0.5% dibutyltin dilaurate. The reaction mixture was heated for at least 2 hours at 80° C. until the % NCO was less than 0.1% as determined by titration and the peak of NCO disappeared on the FTIR spectrum. The viscosity of the acrylate oligomer was measured by a Brookfield viscometer at various temperatures.

EXAMPLE 5

This example illustrates the preparation of radiation-curable polyurethane using HEA and low free MDI prepolymer with PTMEG polyol in accordance with the invention.

A prepolymer was prepared by first charging 1750 parts MDI which was dissolved in 1750 parts dimethyl phthalate, then charging 1000 parts PTMEG 1000 (1000 MW) to a batch reaction flask equipped with a nitrogen sweep, an agitator, a thermometer, a heating mantle and a vacuum source. The molar ratio of MDI to PTMEG (hence the equivalent ratio of NCO groups to OH groups) was 7:1. The reaction mixture was heated for 6 hours at 80° C. with a vacuum of 1–10 torr during the last hour to remove entrained gases.

The crude reaction mixture was then processed through a wiped film evaporator to remove unreacted MDI monomer and dimethyl phthalate. The vacuum was 0.04 Torr or less, the jacket temperature was 160° C. and the condenser temperature was 20° C.

The stripped prepolymer contained less than 0.5% free MDI. It had 5.10% NCO content, 91% of the theoretical value of 5.60% for prepolymer of pure MDI-PTMEG-MDI structure (1500 MW when PTMEG is 1000 MW).

Then 1000 parts of the stripped prepolymer above was charged first followed by 148 parts of 2-hydroxyethyl acrylate, 200 ppm 4-methoxyphenol and 0.5% dibutyltin dilaurate to a batch reaction flask equipped with a dry air purge, an agitator, a thermometer and a heating mantle. The reaction mixture was heated for at least 2 hours at 80° C., until the % NCO was less than 0.1 via titration and the peak of NCO disappeared on the FTIR spectrum. The viscosity of the radiation-curable polyurethane was measured by a Brookfield viscometer at various temperatures.

COMPARATIVE EXAMPLE V

This comparative example illustrates the preparation of a radiation-curable polyurethane using HEA and conventional MDI prepolymer with PTMEG polyol.

A prepolymer was prepared by first charging 500 parts MDI, then 1000 parts PTMEG 1000 (1000 MW) to a batch reaction flask equipped with a nitrogen sweep, an agitator, a thermometer, a heating mantle and a vacuum source. The molar ratio of MDI to PTMEG (hence the equivalent ratio of NCO groups to OH groups) was 2:1. The reaction mixture was heated for 6 hours at 80° C. with a vacuum of 1–10 Torr during the last hour to remove entrained gases.

Then to the prepolymer above was charged by 244 parts of 2-hydroxyethyl acrylate, followed by 200 ppm 4-methoxyphenol and 0.5% dibutyltin dilaurate. The reaction mixture was heated for at least 2 hours at 80° C., until the % NCO was less than 0.1% via titration and the peak of NCO disappeared on the FTIR spectrum. The viscosity of the radiation-curable polyurethane was measured by a Brookfield viscometer at various temperatures.

EXAMPLE 6

This example illustrates the preparation of a radiation-curable polyurethane oligomer using HEMA and low free MDI prepolymer with PTMEG polyol in accordance with the invention.

A prepolymer was prepared by first charging 1750 parts MDI which was dissolved in 1750 parts dimethyl phthalate, then charging 1000 parts PTMEG 1000 (1000 MW) to a batch reaction flask equipped with a nitrogen sweep, an agitator, a thermometer, a heating mantle and a vacuum source. The molar ratio of MDI to PTMEG (hence the equivalent ratio of NCO groups to OH groups) was 7:1. The reaction mixture was heated for 6 hours at 80° C. with a vacuum of 1–10 Torr during the last hour to remove entrained gases.

The crude reaction mixture was then processed through a wiped film evaporator to remove unreacted MDI monomer and dimethyl phthalate. The vacuum was 0.04 Torr or less, the jacket temperature was 160° C. and the condenser temperature was 20° C.

The stripped prepolymer contained less than 0.5% free MDI. It had 5.10% NCO content, 91% of the theoretical value of 5.60% for prepolymer of pure MDI-PTMEG-MDI structure (1500 MW when PTMEG is 1000 MW).

Then 1000 parts of the stripped prepolymer above was charged first followed by 166 parts of 2-hydroxyethyl methacrylate, 200 ppm 4-methoxyphenol and 0.5% dibutyltin dilaurate to a batch reaction flask equipped with a dry air purge, an agitator, a thermometer and a heating mantle. The reaction mixture was heated for at least 2 hours at 80° C., until the % NCO was less than 0.1% via titration and the peak of NCO disappeared on the FTIR spectrum. The viscosity of the radiation-curable polyurethane was measured by a Brookfield viscometer at various temperatures.

COMPARATIVE EXAMPLE VI

This comparative example illustrates the preparation of radiation-curable polyurethane using HEMA and conventional MDI prepolymer with PTMEG polyol.

A prepolymer was prepared by first charging 500 parts MDI, then 1000 parts PTMEG 1000 (1000 MW) to a batch reaction flask equipped with a nitrogen sweep, an agitator, a thermometer, a heating mantle and a vacuum source. The molar ratio of MDI to PTMEG (hence the equivalent ratio of NCO groups to OH groups) was 2:1. The reaction mixture was heated for 6 hours at 80° C. with vacuum of 1–10 Torr during the last hour to remove entrained gases.

Then to the prepolymer above was charged by 274 parts of 2-hydroxyethyl methacrylate, followed by 200 ppm 4-methoxyphenol and 0.5% dibutyltin dilaurate. The reaction mixture was heated for at least 2 hours at 80° C., until the % NCO was less than 0.1 via titration and the peak of NCO disappeared on the FTIR spectrum. The viscosity of the radiation-curable polyurethane was measured by a Brookfield viscometer at various temperatures.

EXAMPLE 7

This example illustrates the preparation of a radiation-curable polyurethane using HEA and low free PPDI prepolymer with PTMEG polyol in accordance with the invention.

A prepolymer was prepared by first charging 560 parts PPDI which was dissolved in 1000 parts dimethyl adipate and 500 parts dimethyl phthalate, then charging 1000 parts PTMEG 1000 (1000 MW) to a batch reaction flask equipped with a nitrogen sweep, an agitator, a thermometer, a heating mantle and a vacuum source. The molar ratio of PPDI to PTMEG (hence the equivalent ratio of NCO groups to OH groups) was 3.5:1. The reaction mixture was heated for 6 hours at 80° C. with vacuum of 1–10 Torr during the last hour to remove entrained gases.

The crude reaction mixture was then processed through a wiped film evaporator to remove unreacted PPDI monomer and dimethyl adipate and dimethyl phthalate. The vacuum was 0.04 Torr or less, the jacket temperature was 120° C. and the condenser temperature was 20° C.

The stripped prepolymer contained less than 0.1% free PPDI. It had 5.75% NCO content, 90% of the theoretical value of 6.37% for prepolymer of pure PPDI-PTMEG-PPDI structure (1320 MW when PTMEG is 1000 MW).

Then 1000 parts of the stripped prepolymer above was charged first followed by 167 parts of 2-hydroxyethyl acrylate, 200 ppm 4-methoxyphenol and 0.5% dibutyltin dilaurate to a batch reaction flask equipped with a dry air purge, an agitator, a thermometer and a heating mantle. The reaction mixture was heated for at least 2 hours at 80° C., until the % NCO was less than 0.1 via titration and the peak of NCO disappeared on FTIR spectrum. The viscosity of the radiation-curable polyurethane was measured with a Brookfield Viscometer at various temperatures.

COMPARATIVE EXAMPLE VII

This comparative example illustrates the preparation of radiation-curable polyurethane using HEA and conventional PPDI prepolymer with PTMEG polyol.

A prepolymer was prepared by first charging 320 parts PPDI, then 1000 parts PTMEG 1000 (1000 MW) to a batch reaction flask equipped with a nitrogen sweep, an agitator, a thermometer, a heating mantle and a vacuum source. The molar ratio of PPDI to PTMEG (hence the equivalent ratio of NCO groups to OH groups) was 2:1. The reaction mixture was heated for 6 hours at 80° C. with vacuum of 1–10 Torr during the last hour to remove entrained gases.

Then to the prepolymer above was first charged 244 parts of 2-hydroxyethyl acrylate, followed by 200 ppm 4-methoxyphenol and 0.5% dibutyltin dilaurate. The reaction mixture was heated for at least 2 hours at 80° C., until the % NCO was less than 0.1 via titration and the peak of NCO disappeared on the FTIR spectrum. The viscosity of the radiation-curable polyurethane was measured by a Brookfield viscometer at various temperatures.

EXAMPLE 8

This example illustrates the preparation of radiation-curable polyurethane using HEA and low free HDI prepolymer with PTMEG polyol in accordance with the invention.

A prepolymer was prepared by first charging 882 parts HDI, then 1000 parts PTMEG 1000 (952 MW) to a batch reaction flask equipped with a nitrogen sweep, an agitator, a thermometer, a heating mantle and a vacuum source. The molar ratio of HDI to PTMEG (hence the equivalent ratio of NCO groups to OH groups) was 10:1. The reaction mixture was heated for 6 hours at 80° C. with vacuum of 1–10 Torr during the last hour to remove entrained gases.

The crude reaction mixture was then processed through a wiped film evaporator to remove unreacted HDI monomer.

The vacuum was 0.04 Torr or less, the jacket temperature was 120° C. and the condenser temperature was 5° C.

The stripped prepolymer contained less than 0.1% free HDI. It had 6.12% NCO content, 94% of the theoretical value of 6.53% for prepolymer of pure ABA structure (1288 MW when PTMEG is 952 MW).

Then 1000 parts of the stripped prepolymer above was first charged followed by 178 parts of 2-hydroxyethyl acrylate, 200 ppm 4-methoxyphenol and 0.5% dibutyltin dilaurate to a batch reaction flask equipped with a dry air purge, an agitator, a thermometer, and a heating mantle. The reaction mixture was heated for at least 2 hours at 80° C., until the % NCO was less than 0.1 via titration and the peak of NCO disappeared on the FTIR spectrum. The viscosity of the acrylate oligomer was measured by a Brookfield viscometer at various temperatures.

The viscosities at different temperatures of the radiation-curable polyurethanes of Examples 1–8 and, those of Comparative Examples I–VII are set forth in Table 1 below.

TABLE 1

| Samples | Viscosity, cP | | | |
|---|---|---|---|---|
| | 70° C. | 60° C. | 50° C. | 40° C. |
| Example 1, LFTDI/PTMEG/HEA | 2,500 | 3,860 | 6,840 | 14,080 |
| Comparative I, conventional type | 2,760 | 5,280 | 10,120 | 15,880 |
| Example 2, LFTDI/PTMEG/HEMA | 1,720 | 3,100 | 5,630 | 10,540 |
| Comparative II, conventional type | 3,120 | 4,800 | 8,720 | 16,840 |
| Example 3, LFTDI/PBHAG/HEA | 8,460 | 14,440 | 22,440 | 31,560 |
| Comparative III, conventional type | 48,000 | 100,000 | 196,000 | 260,000 |
| Example 4, LFTDI/PBHAG/HEMA | 7,000 | 16,440 | 24,550 | 33,660 |
| Comparative IV, conventional type | 40,000 | 67,000 | 88,000 | 240,000 |
| Example 5, LFMDI/PTMEG/HEA | 5,600 | 6,300 | 11,780 | 23,690 |
| Comparative V, conventional type | 8,480 | 11,000 | 19,400 | 39,720 |
| Example 6, LFMDI/PTMEG/HEMA | 3,400 | 6,240 | 11,960 | 23,640 |
| Comparative VI, conventional type | 3,560 | 6,720 | 12,500 | 25,670 |
| Example 7, LFPPDI/PTMEG/HEA | 2,540 | 4,760 | 8,600 | 18,640 |
| Comparative VII, conventional type | 10,000 | 10,720 | 16,980 | 38,260 |
| Example 8, LFHDI/PTMEG/HEA | 640 | 1,100 | 1,840 | 3,540 |

These data show the significant reductions in the viscosities of the radiation-curable polyurethanes made from low free isocyanate prepolymer in accordance with the invention (Examples 1–8) as compared with the viscosities of the prior art polyurethanes (Comparative Examples I–VII).

EXAMPLE 9

Not only is the zero shear rate viscosity of the radiation-curable polyurethane herein important for efficient coatings application, for a steady and fast application of coating to moving articles such as fiber it is advantageous to have a good rheology as well. It is therefore desirable to have a large enough Newtonian plateau on a dependence of a complex viscosity vs. shear rate.

In this example, the master curves for the polyurethanes of Example 6 (Polyurethane A) and Comparative Example VI (Polyurethane B) are presented in FIG. 1. The Theological master curves of FIG. 1 were constructed for the two polyurethanes using a time-temperature-superposition and the Williams-Landel-Ferry (WLF) equation. The time temperature superposition (TTS) response of the polyurethanes was characterized via dynamic Theological analysis. The polyurethanes were tested on the TA Instruments ARES rheometer between 25 mm diameter plates. The polyurethane samples were melted between the plates at 50° C. and then tested at a gap of 1.5 mm. The specimens were tested from –60 to 60° C. at 5° C. increments as a function of frequency between 0.1 to 100 radian/second and a complex viscosity ($\eta^*$) was measured. The data at different temperatures were then shifted to 25° C. to form a master curve by using the WLF equation:

$$\log(\alpha_T) = \log\left(\frac{\eta(T)}{\eta(T_r)}\right) = \frac{-C_1(T-T_r)}{C_2+(T-T_r)} \qquad (1)$$

wherein $\alpha_T$ is the shift factor, $C_1$ and $C_2$ are the WLF constants and $T_r$ is the reference temperature.

The master curve for Polyurethane B (prior art) in FIG. 1 shows the known already higher viscosity at zero shear rate and the absence of a Newtonian plateau (shear thinning from the beginning). The master curve for Polyurethane A (of this invention) shows an onset of Newtonian behavior at a relatively high shear rate of ~$10^3$ rad/s, indicating a large Newtonian plateau.

What is claimed is:

1. A radiation-curable polyurethane produced by the process which comprises:
   (a) reacting at least one diisocyanate monomer with a combination of a high molecular weight polyol and a low molecular weight polyol to provide a polyurethane prepolymer containing unreacted diisocyanate monomer, wherein each polyol is selected from the group consisting of polyether, polyester, polycarbonate, polycaprolactone and hydrocarbon polyols having a number average molecular weight of from about 60 to about 12,000;
   b) removing unreacted diisocyanate monomer from the polyurethane prepolymer to provide polyurethane prepolymer of reduced unreacted diisocyanate monomer content; and,
   c) reacting the polyurethane prepolymer of reduced unreacted diisocyanate monomer content with an acrylic monomer to provide radiation-curable polyurethane.

2. The radiation-curable polyurethane of claim 1 wherein the diisocyanate monomer is at least one diisocyanate monomer selected from the group consisting of 2,4 and 2,6 toluene diisocyanate, 4,4'-diphenyl methane diisocyanate, p-phenylene diisocyanate, tolidene diisocyanate, hexamethylene diisocyanate, tetramethylxylene diisocyanate, isophorone diisocyanate and dicyclohexylmethane diisocyanate.

3. The radiation-curable polyurethane of claim 1 wherein the polyether polyol is represented by the general formula HO(RO)$_n$H, wherein R is an alkylene radical and n is an integer large enough that the polyether polyol has a number average molecular weight of at least about 250.

4. The radiation-curable polyurethane of claim 3 wherein the polyether polyol is a polytetramethylene ether glycol.

5. The radiation-curable polyurethane of claim 1 wherein the low molecular weight polyol is an aliphatic polyol selected from the group consisting of ethylene glycol, diethylene glycol, triethylene glycol, tetraethylene glycol, propylene glycol, dipropylene glycol, tripropylene glycol, neopentyl glycol, 1,3-butanediol, 1,4-butanediol, and the like.

6. The radiation-curable polyurethane of claim 1 wherein the low molecular weight polyol is less than about 20% of the combination of high molecular weight polyol and low molecular weight polyol.

7. The radiation-curable polyurethane of claim 6 wherein the low molecular weight polyol is up to about 15% of the combination of high molecular weight polyol and low molecular weight polyol.

8. A radiation-curable polyurethane produced by the process which comprises:
(a) reacting at least one diisocyanate monomer with at least one polyol to provide a polyurethane prepolymer containing unreacted diisocyanate monomer, wherein the polyol is selected from the group consisting of polyether, polyester, polycarbonate, polycaprolactone and hydrocarbon polyols having a number average molecular weight of from about 100 to about 12,000, and wherein the polyester polyol is a mixture of a polyester of butanediol, hexanediol and adipic acid;
(b) removing unreacted diisocyanate monomer from the polyurethane prepolymer to provide polyurethane prepolymer of reduced unreacted diisocyanate monomer content; and,
(c) reacting the polyurethane prepolymer of reduced unreacted diisocyanate monomer content with an acrylic monomer to provide radiation-curable polyurethane.

9. The radiation-curable polyurethane of claim 1 wherein the polyurethane prepolymer is of the general structure ABA wherein A denotes diisocyanate and B denotes a polyol.

10. The radiation-curable polyurethane of claim 1 wherein the removal of unreacted diisocyanate monomer from the polyurethane prepolymer is accomplished through a process of distillation.

11. The radiation-curable polyurethane of claim 10 wherein the process of distillation is accomplished through an agitated film distillation system.

12. The radiation-curable polyurethane of claim 11 wherein the agitated film distillation system comprises continuous units with internal condensers that can be combined in series.

13. The radiation-curable polyurethane of claim 10 wherein the process of distillation utilizes a wiped film vacuum distillation process.

14. The radiation-curable polyurethane of claim 1 wherein the removal of unreacted diisocyanate monomer from the polyurethane prepolymer reduces the content of unreacted diisocyanate monomer polyurethane prepolymer to less than about 2% by weight.

15. The radiation-curable polyurethane of claim 14 wherein the removal of unreacted diisocyanate monomer from the polyurethane prepolymer reduces the content of unreacted diisocyanate monomer polyurethane prepolymer to less than about 0.5% by weight.

16. A radiation-curable polyurethane produced by the process which comprises:
(a) reacting at least one diisocyanate monomer with at least one polyol to provide a polyurethane prepolymer containing unreacted diisocyanate monomer;
(b) removing unreacted diisocyanate monomer from the polyurethane prepolymer to provide polyurethane prepolymer of reduced unreacted diisocyanate monomer content, wherein the removal of unreacted diisocyanate monomer from the polyurethane prepolymer reduces the content of unreacted diisocyanate monomer polyurethane prepolymer to less than about 0.1% by weight; and,
(c) reacting the polyurethane prepolymer of reduced unreacted diisocyanate monomer content with an acrylic monomer to provide radiation-curable polyurethane.

17. The radiation-curable polyurethane of claim 1 wherein the acrylic monomer possesses at least one reactive functionality.

18. The radiation-curable polyurethane of claim 17 wherein the acrylic monomer possessing at least one reactive functionality is selected from the group consisting of vinyl carboxylic acid, acrylic acid, methacrylic acid, aminoalkyl acrylates, aminoalkyl methacrylates, hydroxyalkyl acrylates, hydroxyalkyl methacrylates and mixtures thereof.

19. The radiation-curable polyurethane of claim 18 wherein the hydroxyalkyl acrylate is selected from the group consisting of hydroxyethyl acrylate, hydroxyethyl methacrylate, hydroxypropyl acrylate, hydroxypropyl methacrylate, hydroxybutylacrylate and mixtures thereof.

20. The radiation-curable composition of claim 1 wherein the polyurethane prepolymer of reduced unreacted diisocyanate monomer content is end-capped with an acrylate.

21. The radiation-curable polyurethane of claim 1 wherein the reaction of at least one diisocyanate monomer with the combination of polyols provides for a molar excess of diisocyanate monomer over polyol.

22. The radiation-curable polyurethane of claim 21 wherein the molar excess of diisocyanate monomer over polyol is from about 2:1 to about 30:1 molar ratio.

23. The radiation-curable polyurethane of claim 22 wherein the molar excess of diisocyanate monomer over polyol is from about 3:1 to about 18:1 molar ratio.

24. The radiation-curable polyurethane of claim 23 wherein the reaction of at least one diisocyanate monomer with the combination of polyols has a solvent added thereto.

25. A radiation-curable polyurethane produced by the process which comprises:
(a) reacting at least one diisocyanate monomer with at least one polyol to provide a polyurethane prepolymer containing unreacted diisocyanate monomer, wherein the reaction of at least one diisocyanate monomer with at least one polyol provides for a molar excess of diisocyanate monomer over polyol from about 3:1 to about 20:1 molar ratio, and wherein the reaction of at least one diisocyanate monomer with at least one polyol has a solvent added thereto, wherein the solvent is selected from the group consisting of dimethyl adipate and dimethyl phthalate;
(b) removing unreacted diisocyanate monomer from the polyurethane prepolymer to provide polyurethane prepolymer of reduced unreacted diisocyanate monomer content; and,
(c) reacting the polyurethane prepolymer of reduced unreacted diisocyanate monomer content with an acrylic monomer to provide radiation-curable polyurethane.

26. The radiation-curable polyurethane of claim 1 formed from a prepolymer of step (b) having a NCO content of at least about 70% of the theoretical NCO content.

27. The radiation-curable polyurethane of claim 1 formed from a prepolymer of step (b) having a NCO content of at least about 80% of the theoretical NCO content.

28. The radiation-curable polyurethane of claim 18 wherein the hydroxyalkyl acrylate has a ratio of available hydroxyl functionality to the available NCO content of the polyurethane prepolymer of reduced unreacted diisocyanate monomer content of from about 0.9:1 to about 1.2:1.

29. The radiation-curable polyurethane of claim 28 wherein the hydroxyalkyl acrylate has a ratio of available hydroxyl functionality to the available NCO content of the polyurethane prepolymer of reduced unreacted diisocyanate monomer content of from about 1.05:1 to about 1.10:1.

30. The radiation-curable polyurethane of claim 1 wherein step (c) can have added thereto one or more inhibitors of free radical reactions in an amount of from about 50 ppm to about 1% by weight.

31. The radiation-curable polyurethane of claim 30 wherein the inhibitor of free radical reactions is 4-methoxyphenol.

32. The radiation-curable polyurethane of claim 1 wherein step (c) can have added thereto one or more catalysts in an amount of up to about 3% by weight.

33. The radiation-curable polyurethane of claim 1 wherein at the temperature of about 50° C. the viscosity is from about 500 to about 28,000 cps.

34. A radiation-curable polyurethane comprising:
a) a polyurethane prepolymer terminated with a diisocyanate monomer selected from the group consisting of 2,4- and 2,6-toluene diisocyanate, 4,4'-diphenyl methane diisocyanate, p-phenylene diisocyanate, tolidene diisocyanate, hexamethylene diisocyanate, tetramethylxylene diisocyanate, isophorone diisocyanate, and dicyclohexylmethane diisocyanate, said polyurethane prepolymer being the reaction product of one or more of the said diisocyanate monomers and at least one polyol selected from the group consisting of polyether, polyester, polycarbonate, polycaprolactone and hydrocarbon polyols having a number average molecular weight of from about 250 to about 10,000 from which unreacted diisocyanate monomer has been removed; said polyurethane prepolymer comprising no more than about 2 wt % free diisocyanate monomer and having at least about 80% of theoretical NCO content for pure ABA structure and;
b) an acrylic monomer possessing at least one reactive functionality selected from the group consisting of vinyl carboxylic acids, acrylic acid, methacrylic acid, aminoalkyl acrylates, aminoalkyl methacrylates, hydroxyalkyl acrylates, hydroxyalkyl methacrylates and mixtures thereof, said radiation-curable polyurethane containing a ratio of available hydroxy functionality of the hydroxyalkyl acrylate to NCO content of the prepolymer of reduced unreacted diisocyanate monomer content of from about 0.9:1 to about 1.2:1.

35. A substrate coated with a radiation-curable polyurethane produced by the process of claim 1.

36. A substrate coated with a radiation-curable polyurethane produced by the process of claim 8.

37. A substrate coated with a radiation-curable polyurethane produced by the process of claim 16.

38. A substrate coated with a radiation-curable polyurethane produced by the process of claim 25.

39. The radiation-curable polyurethane of claim 1 wherein the high molecular weight polyol has a number average molecular weight of from about 250 to about 12,000 and the low molecular weight polyol has a number average molecular weight of from 60 to about 250.

40. The radiation-curable polyurethane of claim 1 wherein the high molecular weight polyol has a number average molecular weight of from about 400 to about 6,000.

* * * * *